(12) United States Patent
Bowra et al.

(10) Patent No.: US 8,380,864 B2
(45) Date of Patent: Feb. 19, 2013

(54) MEDIA STREAM SLICING AND PROCESSING LOAD ALLOCATION FOR MULTI-USER MEDIA SYSTEMS

(75) Inventors: Todd Bowra, Redmond, WA (US); Ashley C. Speicher, Redmond, WA (US); Nicholas J. Fang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1288 days.

(21) Appl. No.: 11/645,885

(22) Filed: Dec. 27, 2006

(65) Prior Publication Data

US 2008/0162713 A1 Jul. 3, 2008

(51) Int. Cl.
*G06F 15/16* (2006.01)
(52) U.S. Cl. ...................................................... 709/231
(58) Field of Classification Search .................. 709/231
See application file for complete search history.

(56) References Cited

U.S. PATENT DOCUMENTS

| | | | | |
|---|---|---|---|---|
| 5,784,649 | A * | 7/1998 | Begur et al. ...................... | 710/52 |
| 6,173,330 | B1 * | 1/2001 | Guo et al. ...................... | 709/232 |
| 6,275,536 | B1 | 8/2001 | Chen et al. | |
| 6,650,705 | B1 | 11/2003 | Vetro et al. | |
| 6,674,717 | B1 * | 1/2004 | Duong-van et al. .......... | 370/230 |
| 6,678,736 | B1 * | 1/2004 | Malmkvist et al. ........... | 709/231 |
| 6,711,212 | B1 | 3/2004 | Lin | |
| 6,931,059 | B1 | 8/2005 | Van Dusen et al. | |
| 6,950,464 | B1 | 9/2005 | Shen et al. | |
| 6,996,129 | B2 | 2/2006 | Krause et al. | |
| 7,174,384 | B2 * | 2/2007 | Cheung et al. ................. | 709/231 |
| 7,191,243 | B2 * | 3/2007 | Roy et al. ....................... | 709/231 |
| RE40,333 | E * | 5/2008 | Malmkvist et al. ........... | 709/231 |
| 7,548,937 | B2 * | 6/2009 | Gu et al. ....................... | 707/104.1 |
| 7,792,982 | B2 * | 9/2010 | Padmanabhan et al. ...... | 709/231 |
| 2002/0122430 | A1 * | 9/2002 | Haberman et al. ............. | 370/429 |
| 2003/0033321 | A1 * | 2/2003 | Schrempp et al. ......... | 707/104.1 |
| 2003/0093546 | A1 * | 5/2003 | Roy et al. ....................... | 709/231 |
| 2003/0135863 | A1 * | 7/2003 | Van Der Schaar .............. | 725/95 |
| 2003/0233464 | A1 * | 12/2003 | Walpole et al. ............... | 709/231 |
| 2004/0047636 | A1 * | 3/2004 | Guild et al. .................... | 398/147 |
| 2004/0073692 | A1 * | 4/2004 | Gentle et al. ................... | 709/231 |
| 2004/0121790 | A1 * | 6/2004 | Wolff et al. ..................... | 455/518 |
| 2004/0192259 | A1 * | 9/2004 | Xie .............................. | 455/412.1 |
| 2005/0091696 | A1 | 4/2005 | Wolfe et al. | |
| 2005/0132264 | A1 | 6/2005 | Joshi et al. | |
| 2005/0144304 | A1 * | 6/2005 | Hodges et al. ................. | 709/231 |
| 2005/0254447 | A1 | 11/2005 | Miller-Smith | |
| 2006/0168323 | A1 | 7/2006 | Kim et al. | |
| 2006/0184688 | A1 * | 8/2006 | Ganguly et al. ............... | 709/232 |
| 2007/0112972 | A1 * | 5/2007 | Yonge et al. ................... | 709/231 |
| 2007/0266170 | A1 * | 11/2007 | Mockett ......................... | 709/231 |
| 2007/0294425 | A1 * | 12/2007 | Sobti et al. ..................... | 709/231 |

OTHER PUBLICATIONS

Assuncao, et al., "A Frequency-Domain Video Transcoder for Dynamic Bit-Rate Reduction of MPEG-2 Bit Streams", IEEE Transactions on Circuits and Systems for Video Technology, Date: Dec. 8, 1998, vol. 8, http://www.mcl.ie.cuhk.edu.hk/assuncao-csvt-98.pdf.
Cock, et al., "Video adaptation and transcoding", Date: Dec. 1, 2004, http://escher.elis.ugent.be/publ/Edocs/DOC/P104_137.pdf#search=%22Motion%20Vector%20Refinement%20for%20High-Performance%20Transcoding%22.
Youn, et al., "Motion Vector Refinement for High-Performance Transcoding", IEEE Transactions on Multimedia, Date: Mar. 1999, vol. 1, http://coblitz.codeen.org:3125/citeseer.ist.psu.edu/cache/papers/cs/18345/http:zSzzSzwww.cs.kau.sezSzcszSzprtpzSzpaperszSzYoun99_video_transcoding.pdf/youn99motion.pdf.

* cited by examiner

*Primary Examiner* — Brian P Whipple (57) ABSTRACT

Transrate/transcode functionality of media processing units in devices distributed within a networked media system are harnessed to enable media streaming to devices across networks while overcoming insufficient bandwidth to transmit the source content or while providing reformatted media to devices that do not support the source format. A policy engine may reallocate media processing resources for greater efficiency. The policy engine may further schedule time-slicing of media segments in available hardware and software-based codecs. Time-slicing may be used to transformatively process one or more media streams across potentially multiple media processing units connected within a network. The media streams are divided into independently processable segments based upon knowledge of underlying media formats. Processing requirements and a priority processing order may be determined for and assigned to each independently processable segment. The segments may be scheduled for delivery to the media processing units based upon the assigned priority and processing requirements.

20 Claims, 7 Drawing Sheets

MEDIA STREAM SLICING AND PROCESSING LOAD ALLOCATION FOR MULTI-USER MEDIA SYSTEMS

BACKGROUND

Analog media encoder chips used in multimedia personal computers (PCs), television (TV) tuner/decoder cards, set-top boxes, and other media devices increasingly expose media decode and encode capabilities to be used for purposes other than media presentation. For example, some TV tuner/decoder cards now expose hardware accelerated transrate functionality (i.e., the decoding of media content encoded in one media format followed by the reencoding of that media content in the same format at a different bit-rate) and transcode functionality (i.e., the decoding of media content encoded in one media format followed by the reencoding of that media content in a second media format). Current applications that take advantage of the transrating/transcoding functionality exposed by these media encoders are generally directed toward file-based transcoding, one file at a time.

Many consumers are integrating formerly independent media presentation systems into a network under central control with the ability to share media files by streaming the media among the various devices connected with the network. Home networks predominantly use wireless technology, which often has unpredictable throughput, causing quality of service issues for media streaming, particularly when high definition or otherwise high bit-rate content is involved. Many of the devices on a home network include hardware tuner/decoder cards. In addition, media networks controlled by a PC acting as a server may use software on the PC to harness the processor or a media card on the PC to perform transcode or transrate functions to change the format or bit-rate of media files stored on the PC.

SUMMARY

The technology described herein is created to take advantage of the proliferation of digital media receivers and other networked consumer electronics devices that connect with PCs to receive streamed media content. Many of these devices include special purpose processor chips for encoding/decoding and/or compression/decompression of media content (collectively, "codecs"). Further, the central PC may likewise have a hardware codec or may have a software module that may direct the general processor or a graphics card of the PC to function as a codec. In some implementations, the codecs in the media network may be located only on the PC and may be used to optimize content for the various media receivers The transrate/transcode functionality of this hardware may be harnessed to enable media streaming to devices across networks with insufficient bandwidth to support the source content (by transrating or transcoding the media file before transmission to reduce bandwidth requirements) or to devices that do not support the source media format (by transcoding the source media content to a supported format).

In the event that hardware media processing resources are fully allocated before all requests for media content processing can be satisfied, a policy engine may be used to reallocate processing resources for greater efficiency in order to increase the number of requests that can be processed, increase the speed of the processing, or to reorder the processing to best serve current needs. The policy engine may first determine whether time-slicing the hardware codec is an option. An example of time-slicing may be to decode/encode a segment of frames from one stream and then alternate the transformative processing to a segment of frames from a second stream. The policy engine may then determine whether software-based decoding/encoding is an option. In the case of non-real-time transrating/transcoding, hardware and software decode/encode operations can theoretically be infinitely time-sliced, with the resulting transrate/transcode-.operations occurring in the background or during off-peak periods. In the case of real-time transrating/transcoding, time-slicing may still be an option for both hardware and software codecs, depending upon the performance of that codec (i.e., how much faster than real-time the codec can decode/encode and whether or not performance is affected by the time-slicing operation).

Time-slicing may be used to transformatively process one or more media streams across potentially multiple media processing units (MPUs) connected within a network. The media streams may be divided into independently processable segments based upon knowledge of underlying media formats. A priority processing order may then be assigned to the independently processable segments. Processing requirements may also be determined for each independently processable segment. Then the independently processable segments may be scheduled for delivery to one or more of the media processing units, either locally or across the network, based upon the assigned priority and processing requirements for each independently processable segment. Once processed, the segments may be received as a stream back from the media processing units or a stream can be recomposed from the processed segments received from the media processing units and the resulting stream may be routed for output to a presentation device or for storage.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

DETAILED DESCRIPTION

A given media processing unit (MPU) has finite capabilities that will be surpassed if a great enough number of simultaneous operations is requested. For example, one MPU may only support two paired encode and decode operations. This limits the functionality of the MPU, e.g., to recording two TV shows, recording one TV show while watching another, or recording one TV show while transcoding another. As a result, conflicts will invariably arise due to competition for these resources. The transrate/transcode functionality of MPUs in devices distributed within a networked media system may be harnessed to enhance the ability of a networked media system to handle a larger volume of requests for media content and related processing requirements. For example, if efficiently allocated, the MPUs may enable media streaming to devices across networks to overcome insufficient bandwidth to transmit the source content or to provide reformatted media to devices that do not support the source format.

As used herein, the term "media processing unit" or "MPU" refers to any hardware chipset codecs, hardware-assisted codecs, or a central processing unit (CPU) or graphics processing unit (GPU) (e.g., a graphics card) under the control of a software module that provides transformative processing operations to media files or media streams. As used herein, "transformative processing operations" refer to processes for encoding, decoding, compressing, decompressing, transrating, and transcoding media streams. As used herein, codec is a portmanteau of either or both "compressor-decompressor" and "coder-decoder," which describes a device or program capable of performing transformations on a data stream or signal. Codecs can transform the stream or signal into an encoded and/or compressed format (e.g., for transmission, storage, or encryption) and also decode and/or decompress that format for viewing or manipulation in a format more appropriate for these operations.

MPUs may possess several processing characteristics. A first characteristic may be support for real-time media encoding into at least one media format, e.g., Motion Picture Experts Group 2 (MPEG-2) or Windows Media Video (WMV). A second characteristic may be support for real-time media decoding from at least one media format (e.g., MPEG-2 or WMV). Another characteristic may be chained operation of decode followed by encode, which may either be transrating (if the reencoded format matches the source format but the bit-rate is changed) or transcoding (if the reencoded format differs from the source format).

An exemplary MPU operation may include offline file transrating/transcoding, e.g., file decompression and recompression in a different compression format or at a different bit-rate with the output saved to disk or other storage medium for later viewing. Another MPU operation may perform transformative processing to reduce bandwidth and enable network streaming of multimedia content to network-based media receivers to render the media content on an associated presentation device. A further MPU operation may perform real-time media encoding for capturing analog media streams (e.g., analog TV) for storage and later viewing. In one implementation the video may be scaled between the decode and encode operations. For example, a high definition (HD) video may be decoded, scaled to a standard definition (SD) resolution, and then reencoded. Yet another operation may perform real-time media storage to allow users watching live TV to pause, restart, and reverse through the program.

Figure 1:
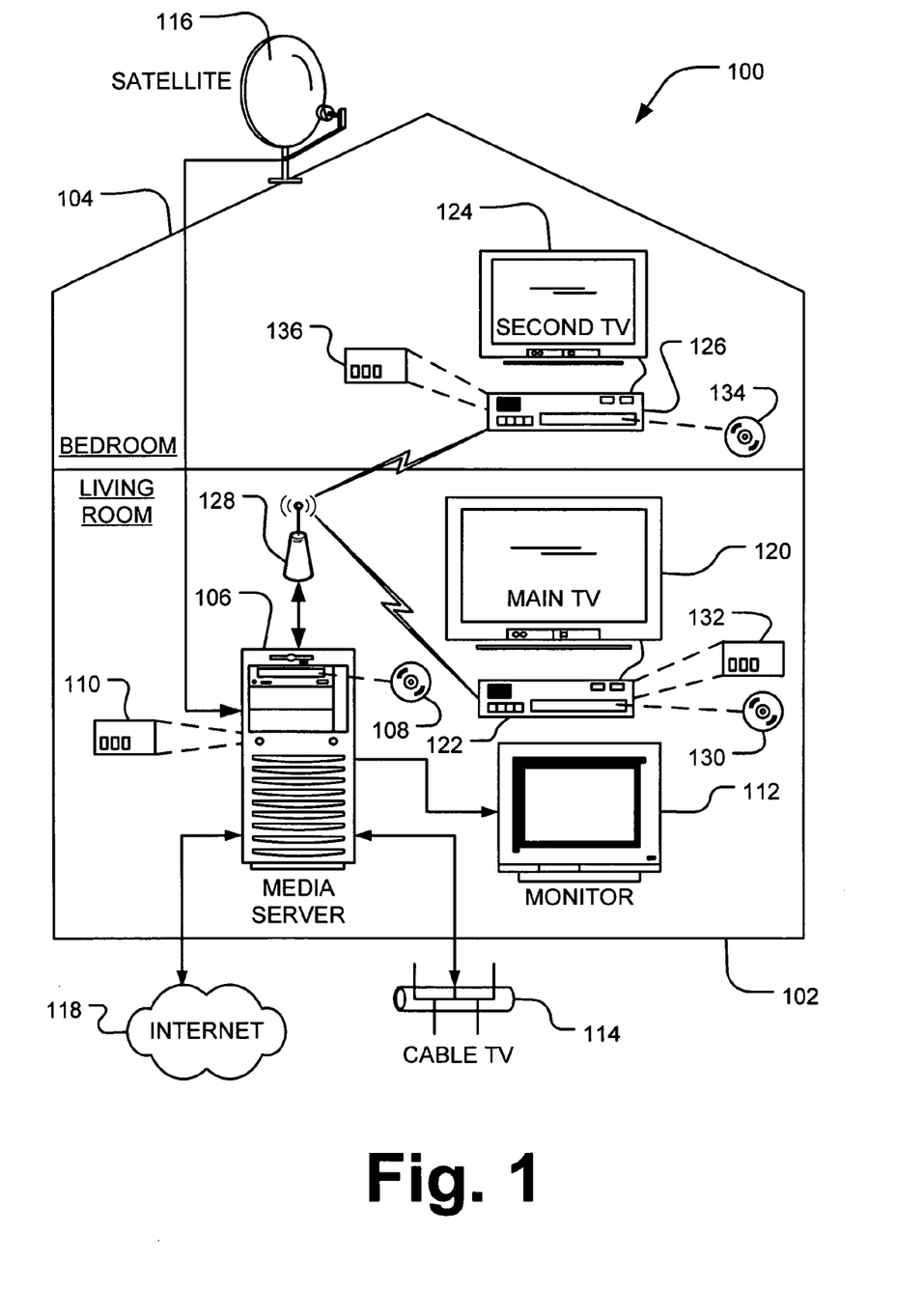
FIG. 1 is a schematic diagram of an exemplary home media system including a media server configured to dynamically allocate media processing resources and distribute media streams for processing.

As indicated above, MPUs may be found as hardware or hardware/software combinations in devices connected within a networked media system. FIG. 1 depicts an exemplary home media system 100 including a living room 102 and a bedroom 104. Central to the media system 100 is a media server 106, in this implementation situated in the living room 102, but it could be located anywhere within the house. The media server 106 may dynamically allocate media processing resources and distribute media streams for processing among media processing units within the media system 100. The media server 106 may further be configured to time-slice media streams into independently processable segments as further described herein.

In one implementation, the media server 106 may be a conventional personal computer (PC) configured to run a multimedia software package, for example, the Windows® XP Media Center Edition operating system (Microsoft Corporation, Redmond Wash.). In such a configuration, the media server 106 may integrate full computing functionality with a complete home entertainment system into a single PC. For example, a user can watch television (TV) in one graphical window of a video monitor, while sending e-mail or working on a spreadsheet in another graphical window on the same monitor. In addition, the media server 106 may also include other features or components, for example: a personal video recorder (PVR) to capture live TV shows for future viewing or to record the future broadcast of a single program or series; a compact disc (CD) or digital video disc (DVD) drive 108 for disc media playback; a memory drive 110 for integrated storage of and access to a user's recorded content, such as TV shows, songs, pictures, and home videos; and an electronic program guide (EPG).

Instead of a conventional PC, the media server 106 may comprise a variety of other devices capable of storing and distributing media content including, for example, a notebook or portable computer, a tablet PC, a workstation, a mainframe computer, a server, an Internet appliance, or combinations thereof. The media server 106 may also be a set-top box capable of delivering media content to a computer where it may be streamed, or the set-top box itself could stream the media content. As the media server 106 may be a full function computer running an operating system, the user may also have the option to run standard computer programs (e.g., word processing and spreadsheets), send and receive e-mails, browse the Internet, or perform other common functions.

In addition to storing media content, the media server 106 may be connected with a variety of media sources, for example, a cable connection 114, a satellite receiver 116, an antenna (not shown for the sake of graphic clarity), and/or a network such as the Internet 118. A user may thus control a live stream of media content (e.g., TV content) received, for example, via the cable connection 114, the satellite receiver 116, or antenna. This capability is enabled by one or more tuners residing in the media server 106. The one or more tuners may alternatively be located remote from the media server 106. In either case, the user may choose a tuner to fit any particular preferences. For example, a user wishing to watch both standard definition (SD) and high definition (HD) content may employ a tuner configured for both types of contents. Alternately, the user may employ an SD tuner for SD content and an HD tuner for HD content separately.

The media system 100 may also include one or more network devices functioning as media receivers 122, 126 placed in communication with the media server 106 through a network 128, for example, a local area network (LAN). In an exemplary embodiment, the media receivers 122, 126 may be a Media Center Extender device, for example, an Xbox 360™ (Microsoft Corporation, Redmond, Wash.). The media receivers 122, 126 may also be implemented as any of a variety of conventional media rendering or computing devices, including, for example, a set-top box, a television, a video gaming console, a desktop PC, a notebook or portable computer, a workstation, a mainframe computer, an Internet appliance, a handheld PC, an MP3 player, a cellular telephone or other wireless communications device, a personal digital assistant (PDA), or combinations thereof. The media receivers 122, 126 may have hardware and/or software transrate/transcode capabilities and may function as media processing units. Each of the media receivers 122, 126 may additionally have optical disc drives 130, 134, respectively, for media playback of compact discs (CD), digital video discs (DVD), high definition DVDs (HD-DVD), Blu-ray discs, or other optical media formats. Each of the media receivers 122, 126 may also have memory drives 132, 136, respectively, to allow the media receivers 122, 126 to function as a DVR. Furthermore, the media receivers 122, 126 may include a tuner as described above.

The network 128 may comprise a wired and/or wireless network, for example, cable, Ethernet, WiFi, a wireless access point (WAP), or any other electronic coupling means, including the Internet. The network 128 may enable communication between the media server 106, the media receivers 122, 126, and any other connected device through packet-based communication protocols, such as transmission control protocol (TCP), Internet protocol (IP), real-time transport protocol (RTP), and real-time transport control protocol (RTCP). Communications may be transmitted directly between devices over a LAN, or they may be carried over a wide area network (WAN), for example, the Internet 118.

One or more video display devices, for example a main TV 120 in the living room 102, a secondary TV 124 in the bedroom 104, and a video monitor 112 may be situated throughout the media system 100. These video display devices may be connected with the media server 106 via the network 128 either directly or via the media receivers 122, 126. As shown in the example of FIG. 1, the main TV 120 and the secondary TV may be coupled to the media receivers 122, 126 through conventional cables. The video monitor 112 may be coupled with the media server 106 directly via a video cable. The media server 106 and media receivers 122, 126 may also or alternatively be coupled with any of a variety of video and audio presentation devices. Media content including TV content may thus be supplied to each of the video display devices 112, 120, 124 over the home network 128 from the media server 106 situated in the living room 104.

The media receivers 122, 126 may be configured to receive streamed media content, including video and TV content, from the media server 106. Media content, and particularly video and TV content, may be transmitted from the media server 106 to the media receivers 122, 126 as streaming media comprised of discrete content packets via any of the network protocols described above. The streamed media content may comprise video IP, SD, and HD content, including video, audio, and image files, decoded on the home network devices 122, 126 for presentation on the connected TVs 120, 124. The media content may further be "mixed" with additional content, for example, an EPG, presentation content related to the media content, a web browser window, and other user interface environments transmitted from the media server for output on the TVs 120, 124 or the monitor 112. Such additional media content may be delivered in a variety of ways using different protocols, including, for example, standard remote desktop protocol (RDP), graphics device interface (GDI), or hypertext markup language (HTML).

In addition to the media receivers 122, 126 and the video display devices 112, 120, 124, the media server 106 may be connected with other peripheral devices, including components such as digital video recorders (DVR), cable or satellite set-top boxes, speakers, and a printer (not shown for the sake of graphic clarity). The media server 106 and media receivers 122, 126 may also enable multi-channel output for speakers. This may be accomplished through the use of digital interconnect outputs, such as Sony-Philips Digital Interface Format (S/PDIF) or TOSLINK® enabling the delivery of Dolby Digital, Digital Theater Sound (DTS), or Pulse Code Modulation (PCM) surround decoding.

Figure 2:
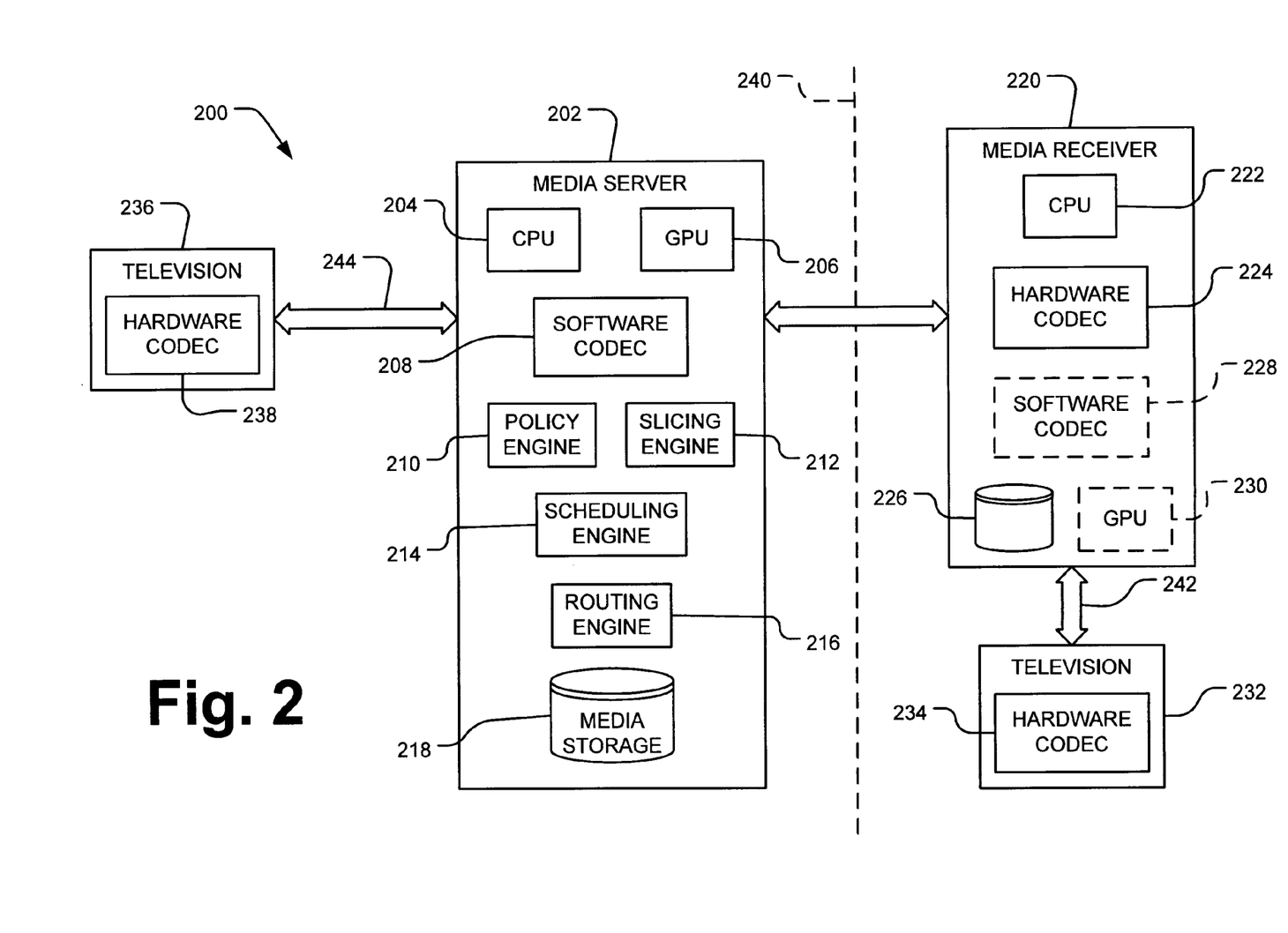
FIG. 2 is a schematic diagram of representative components of an exemplary media system providing processing via distributed MPUs and media stream time-slicing.

An exemplary implementation of a media system 200 is depicted in FIG. 2. The media system 200 may include a media server 202 as previously described with respect to FIG. 1. A media server 202 may include several components that are useful for performing media stream slicing and processing load allocations for media encode and decode for transrate and transcode purposes on devices connected within the media system 200. As shown in FIG. 2, the media server 202 may include a primary CPU or processor 204 and a separate GPU or graphics card 206. Among the software modules stored on and operable upon the media server 202 may be a software codec 208, which may by instantiated to harness either the processor 204 or the graphics card 206 to emulate a hardware codec and process a media stream in a manner similar to a special function hardware codec chip. Both the processor 204 and graphics card 206 may be considered MPUs when under control of the software codec 208.

An additional software module resident on the media server 202 may include a policy engine module 210. The policy engine 210 is primarily responsible for load allocation between several MPUs within the media system 200 that may be harnessed at any particular time to perform transformative processing operations, e.g., encoding, decoding, transrating, or transcoding media streams. Further software components resident on the media server 202 may include a slicing engine module 212, a scheduling engine module 214, and a routing engine module 216. Each of these software components may operate in conjunction with each other to perform the media stream slicing functions which are described in greater detail with respect to FIG. 5 herein. An additional component of the media server 202 may be a memory storage device 218 for storage of media files. Note that media files may be stored elsewhere on other devices within the media system 200, for example, on one or more media receiver devices 220 connected with the media system 200.

As shown in FIG. 2, the media server 202 may be connected with one or more media receiver devices 220. As described with respect to FIG. 1, the media receiver 220, may be connected with the media server 202 over a network link 240, e.g., via an Ethernet connection. Alternatively, the media receiver 220 may be directly connected with the media server, for example, via a serial connection or a USB connection. The media receiver 220 may receive media content from the media server 202 or from other devices within the media system 200 for processing and then may output such processed media content to an attached presentation device, for example, a television 232. The media receiver 220 may be directly connected with the television 232 via a connection 242.

The media receiver 220 may include several components for processing media files for output to the television 232. These components may include a processor 222 and a hardware codec 224, which is generally used for decoding media streams transmitted to the media receiver 220 before output.

In a configuration in which the media receiver 220 further includes a media storage drive 226, the hardware codec 224 may further be used to encode media files for storage on the media storage drive 226. In some embodiments, the media receiver 220 may further include additional MPUs, e.g., a software codec 228 for use with the processor 222 and/or a graphics card 230 if available. In such an embodiment the software codec 228 may be configured to harness the processor 222 and/or the graphics card 230 in order to encode or decode a media stream or perform other media processing tasks without need for a hardware codec 224. Through the connection between the media receiver 220 and the media server 202 by the network link 240, media server 202 may be able to harness the processing power of the media receiver 220 and allocate encoding, decoding, transrating, and transcoding functions to media receiver 220.

Further, it should be noted that the television 232 connected with the media receiver 220 may also include a hardware codec 234. A general purpose of the hardware codec 234 within the television 232 may be to allow full processing of digital media streams received directly by the television 232. However, because of the connection between the television 232 and the media receiver 220, and further the connection between the media receiver 220 and the media server 202 via the network link 240, the hardware codec 234 on the television 232 may be accessed by the media server 202 to perform media stream processing functions for other purposes within the media system 200.

Note also in FIG. 2 that the media server 202 may be connected directly with a presentation device such as a television 236 via a direct connection 244. Again, such direct connection may be via, for example, a serial connection, a USB connection, or an Ethernet connection. The television 236 may also have a hardware codec 238 that may be utilized the media server 202 to handle media stream processing tasks managed the policy engine 210 as described above.

In one implementation, the primary function of the processor 204 of the media server 202 may be to manage the processing load allocation between hardware and software MPUs on various devices within the media system 200 according to the direction of the policy engine 210. As part of this management function, the processor 204 may read media files from the media storage volume 218, transmit media files in a media stream to other devices such as the media receiver 220 or televisions 232, 236 in the media system 200 for processing, receive returning processed media streams, and either store the processed media streams within the media storage volume 218 or retransmit the media streams to another device such as the media player 220 for playback. In such an implementation, by allocating media stream codec functions to other devices, the processing demands on the processor 204 may be reduced by having it perform fewer of the requested transformative processing operations on a media file.

Additionally, if such tasks need to be performed by the media server 202, the software codec 208 may be used to control the graphics card 206 for that purpose. In an alternate embodiment wherein the processor 204 has enough processing power, for example, in the case of a dual core processor, some portion of the processor 204 may manage the load allocation and stream slicing duties while some other portion of the processor 204 may be harnessed by the software codec 208 to process a media stream.

As indicated above, the technology described herein comprises a multi-input, multi-output policy engine configured to maximize the utilization of hardware codecs, maximize the number of simultaneous operations that may be performed by MPUs, and automatically mitigate hardware control contention. The policy engine enables transrating/transcoding functionality to be intelligently shared by multiple users and applications at once. The policy engine dynamically allocates MPU resources between competing requests to enable simultaneous execution of several operations in order to minimize the impact of contention between requests to the user. Furthermore, in the case where not all requests can be satisfied by the available resources, the policy engine may determine an appropriate order of processing to ensure that higher priority requests are handled before lower priority requests.

Figure 3:
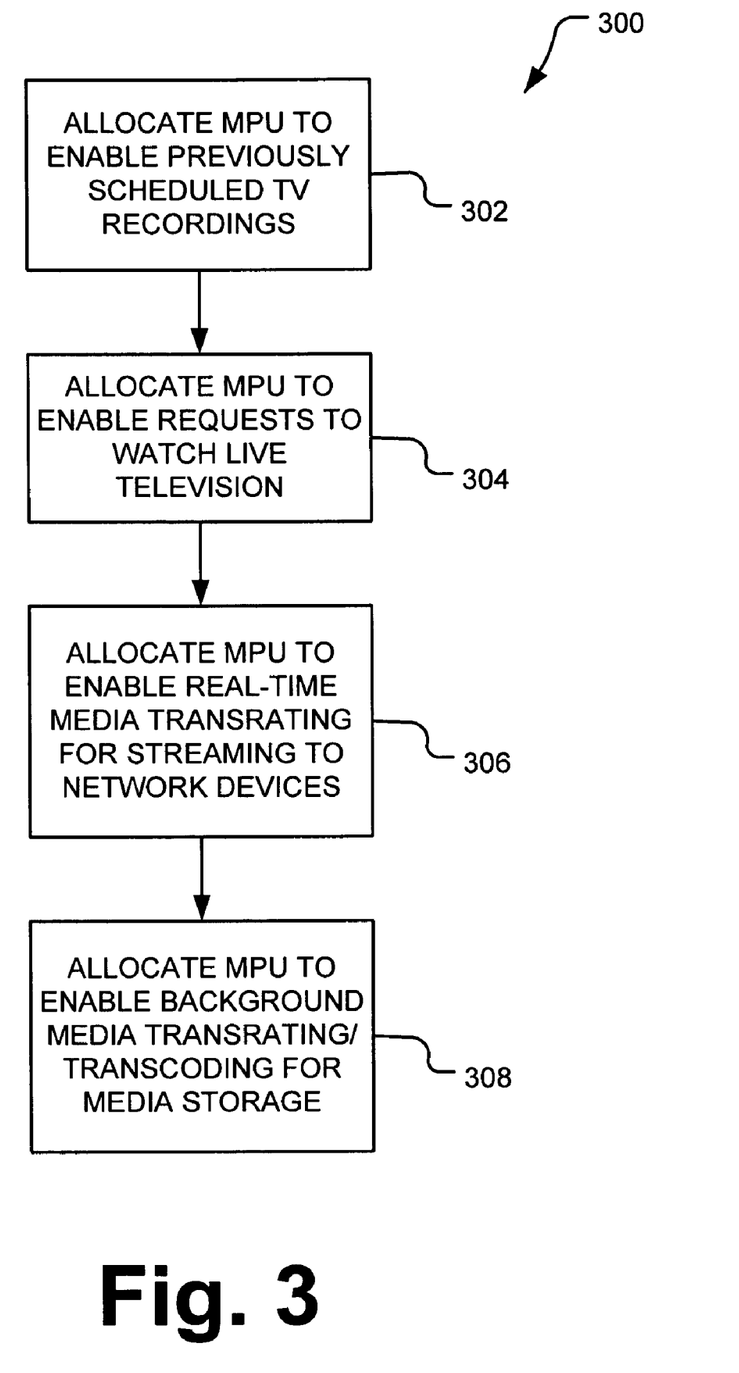
FIG. 3 is a flow diagram of an implementation of a priority allocation scheme for establishing MPU processing priorities among a number of media streams.

FIG. 3 depicts an exemplary priority policy 300 governing the processing load allocation functions of the policy engine. Note that this is only one exemplary order of priorities. Other priorities may be added, priorities may be removed, and the order of the priority list may be changed. In the priority list 300, the primary priority for load allocation may be to ensure that previously scheduled television recordings are recorded. Thus, a first allocation operation 302 may be to allocate a decode/encode processor to enable a previously scheduled TV recording. A secondary priority exemplified in a second allocation operation 304 may be to ensure that a user is able to watch live television in real-time. A tertiary priority exemplified in allocation operation 306 may be to allocate a MPU to enable real-time media transrating to stream a media file to a network device. Thus, in this scenario, given multiple requests, for example, to watch live television and to watch a movie stored remotely on a media server, and given insufficient MPU resources to satisfy both requests, the policy engine may allocate resources to provide the live television before decoding a stored media file.

Finally in the exemplary priority list 300, a further allocation operation 308 may be to allocate a MPU to perform a media transrating or transcoding function at a future time or to run in the background when processing power is available. For example, a user may request that a media file be transrated or transcoded to a different media format for minimizing the required storage space of the file. Because the user has no present desire to view the media file, the policy engine may determine based upon presently available network processing resources to delay such a processing operation until such time as real-time user demand has decreased, for example, in the middle of the night. Alternatively, if there is not presently a real-time presentation need, the policy engine may direct that the processing be performed in the background during periods of available processing power as the media file transformation need not occur in realtime.

Figure 4:
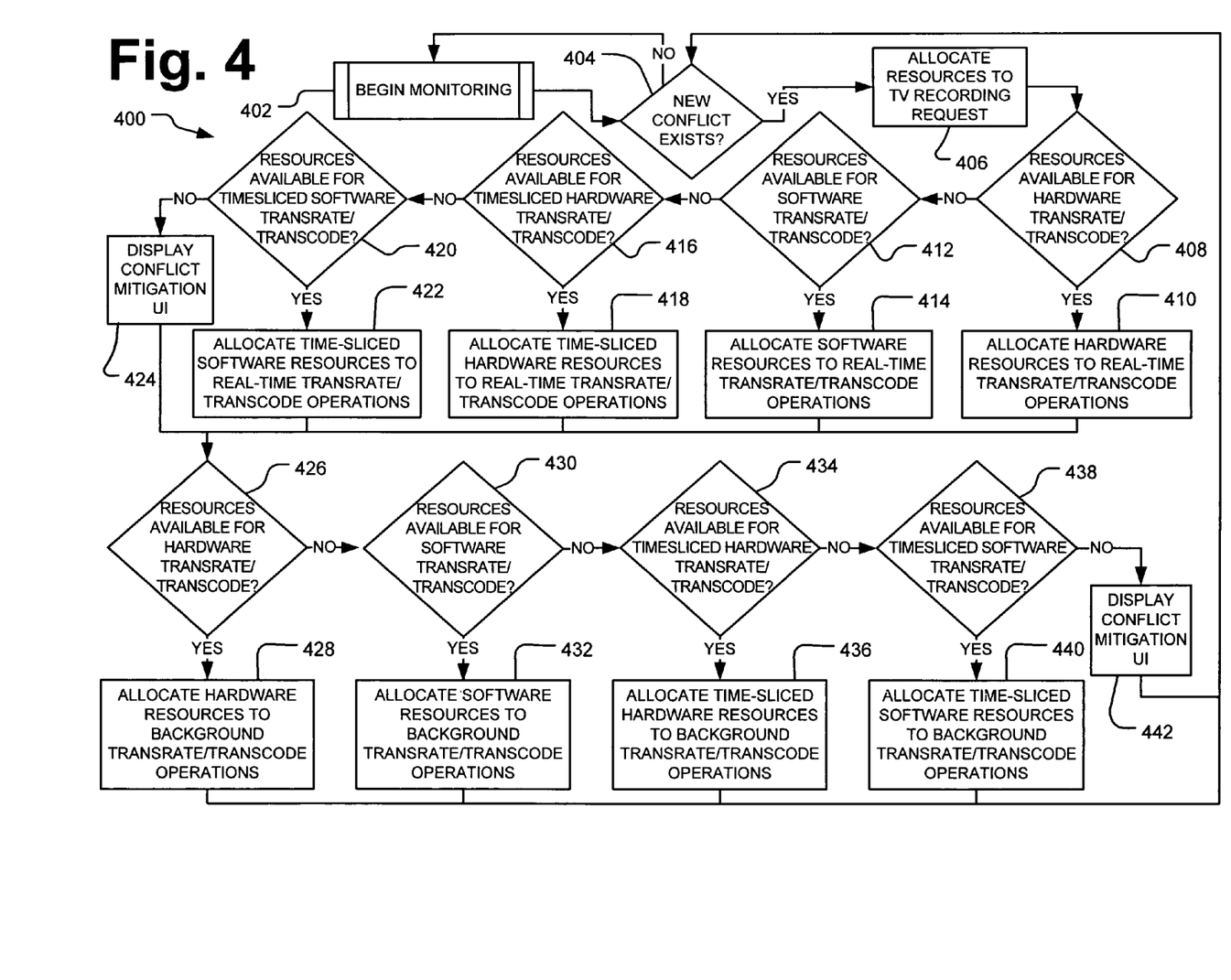
FIG. 4 is a flow diagram of an implementation of a codec resource allocation scheme for determining efficient processing configurations for a number of media streams.

An exemplary implementation of processing load allocation between multiple hardware and software MPUs within a media system according to the exemplary priority list 300 of FIG. 3 is depicted in FIG. 4. The policy engine functions 400 begin with a monitoring operation 402 in which media processing requests within the media system are monitored to determine whether there are conflicts between requests due to a lack of MPU processing power. Thus, a conflict decision operation 404 may determine at a regular appropriate processing interval whether or not a new conflict exists. If the conflict decision operation 404 determines that there is no present conflict, then operation returns to the monitoring operation 402.

If it is determined that there is a processing conflict, a first allocation operation 406 allocates a MPU resource initially to any TV recording requests as per the policy list of FIG. 3. For example, if a user has programmed the media server to record a weekly television show, the policy engine may attempt to select the most efficient processing resource available within the media system in order to accommodate the television recording request. Generally the most efficient decoding and encoding processing operations typically required for recording a stream of media programming may be performed by a hardware MPU. If additional requests for real-time media stream processing beyond the TV recording request, e.g., presentation of a real-time TV broadcast, the policy engine may determine how best to fulfill such additional requests with the resources available within the media system. Thus, the policy engine may in a first resource decision operation 408 determine whether a hardware MPU resource is available for transrate or transcode functions. If a hardware resource is available, the policy engine may in a second allocation operation 410 allocate the available hardware resource for the purpose of real-time transrate and transcode operations to present the live television program.

If in the first resource decision operation 408 the policy engine finds that a hardware resource is not available for processing the real-time requests in addition to the TV recording request, a second resource decision operation 412 may determine whether processing resources are available for a software-implemented transrate and/or transcode process for such additional real-time requests. If a software MPU is available, the policy engine may allocate software and processor resources to perform the real-time transrate/transcode operations in order to meet the live TV presentation request in the third allocation operation 414.

If in the second resource decision operation 412 the policy engine finds that a software-implemented resource is not available or sufficient for processing the real-time requests, a third resource decision operation 416 may determine whether it is possible to time-slice two or more media streams for processing by a hardware MPU. An exemplary process for time-slicing media streams is described in greater detail with respect to FIGS. 5 and 6 herein. If a hardware MPU is available, the policy engine may allocate the hardware to process multiple time-sliced media streams in realtime in order to meet the live TV presentation request in the fourth allocation operation 418.

However, if it is determined that there is no available hardware MPU to process time-sliced media streams, a fourth resource decision operation 420 may determine whether a software MPU has capacity to process multiple time-sliced media streams to perform transcode or transrating operations. If there is software MPU headroom, a fifth allocation operation 422 implemented by the policy engine may provide for real-time transcode/transrate processing of time-sliced media streams by the software MPU.

Alternatively, if no software MPU resources are determined to be available in resource decision operation 420, a UI presentation operation 424 may present a UI to the user identifying the conflict and requesting user input to determine how to mitigate the conflict. Such a request of the user may require that the user identify which of the several competing priorities for media stream processing should take precedence.

Once any hardware or software MPUs have been allocated in operations 410, 414, 418, and 422 for real-time processing, or alternatively, the user has made a selection to mitigate any conflicts via the UI presentation operation 424, the policy engine may next determine whether there are any available processing resources within the media system to handle any lesser priority processing requests. In a fifth resource decision operation 426, the policy engine may first determine whether there are any hardware MPU resources available for processing the lower priority media streams that are not requests for real-time recording playback. According to the priority list of FIG. 3, the next lower media stream processing request may be for handling non-real-time media streams. If the fifth resource decision operation 426 determines that there are adequate hardware resources to perform transrate or transcode operations in the background to any primary processing needs, the policy engine may allocate the hardware in a sixth allocation operation 428.

Alternatively. if the policy engine finds that hardware resources are not available or sufficient for processing the background requests, a sixth resource decision operation 430 may determine whether processing resources are available for a software-implemented transrate and/or transcode process for such additional background requests. If a software MPU is available, the policy engine may allocate software and processor resources to perform the background transrate/transcode operations in order to meet the live TV presentation request in a seventh allocation operation 432.

If the software resources are determined to be inadequate in decision operation 430, the policy engine may next determine in a seventh resource decision operation 434 whether it is possible to time-slice two or more media streams for processing by a hardware MPU. If hardware time-slicing resources are determined to be available, a hardware resource may be allocated into an eighth allocation operation 436 to process multiple time-sliced media streams in the background. Alternatively, if it is determined that there is no available hardware MPU to process time-sliced media streams, an eighth resource decision operation 438 may determine whether a software MPU has capacity to process multiple time-sliced media streams to perform transcode or transrating operations. If there is software MPU headroom, a ninth allocation operation 440 implemented by the policy engine may provide for background transcode/transrate processing of time-sliced media streams by the software MPU.

However, if in the eighth resource decision operation 438 it is determined that there is no processing capacity to allow for a software MPU to process time-sliced media streams, a conflict mitigation UI may be displayed in display operation 442 thereby allowing the user to choose from among the desired media processing operations and manually allocate priority. Once all the necessary allocation operations have been performed according the policy list, the policy engine may return to the conflict decision operation 404 to continue to monitor for conflicts in resource allocation and to iteratively maximize the use of hardware and software MPU resources.

Figure 5:
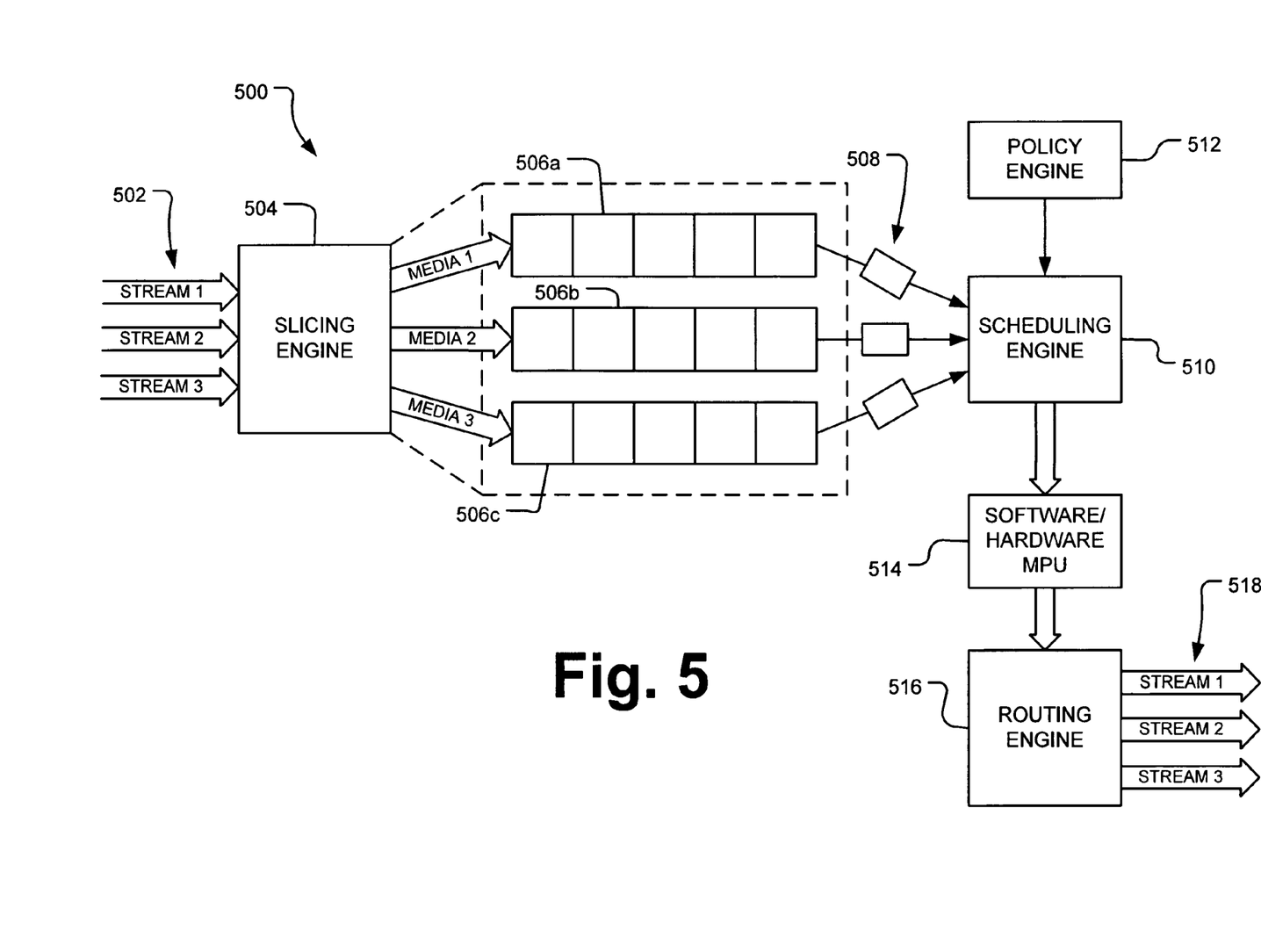
FIG. 5 is a schematic diagram of exemplary modules for time-slicing a plurality of media streams to maximize the capacity of MPU processing resources.

FIG. 5 depicts in greater detail an implementation of the functionality of the slicing engine module 504, the scheduling engine module 510, and the routing engine module 516, previously identified as components of the media server in FIG. 2. As indicated in the prior discussion of FIG. 4, if the hardware and software MPU resources are insufficient to discretely handle a request for real-time processing of multiple media streams within the media system, the policy engine module 512 may attempt to time-slice the processing of two or more media streams through one or more software or hardware MPUs. The term "time-slicing" is meant to describe a concept of segmenting media streams into internally dependant groups or blocks, hereinafter termed independently processable segments 506a, 506b, 506c of data, that may be independently processed through a software or hardware MPU, whereby the resulting processed segments may be recomposed into a processed version of the original media stream. The independently processable segments 506a, 506b, 506c are small enough in length to allow a MPU processing at speeds faster than real-time to effectively process multiple streams simultaneously and output multiple processed media streams for playback with sufficient speeds such that none of the media streams suffers from starvation.

As shown in FIG. 5, a plurality of media streams requested for real-time playback may be pulled from their respected storage locations or from a real-time media transmission into the slicing engine 504. In one respect, the slicing engine 504 may act as buffer to store segments of each of the media streams. In another aspect, the slicing engine 504 slices or portions each of the media streams into internally dependant or self-contained independently processable segments that may be independently handled by a software or hardware MPU 514. Each segment in a sliced media stream 506a, 506b, 506c may be partitioned based upon the format of the particular media stream. For example, if an exemplary media stream is in an MPEG 2 format, the data may be arranged as a closed "group of pictures" (GOP) composed of I, B, and P frames in the parlance of the MPEG 2 standard. In a closed GOP all of the frames are interrelated and rely only on other frames in the GOP for information needed to render a series of individual frames. However, each closed GOP is self-contained in the media stream. Once a closed GOP is processed, any following closed GOP is completely independent and does not need any information from a prior closed GOP in order to render complete video frames. Similar grouping structures are provided in other video and audio compression formats. For example, the WMV format processes data into groups of key frames with related predictive frames.

While the slicing engine 504 may merely create the independently processable segments 506a, 506b, 506c upon every GOP in a particular format, the slicing engine 504 may alternatively combine several successive groups of pictures or data segments within a media stream into an independently processable segment 506a, 506b, 506c. Such a larger segment of information may be useful to feed to a downstream device to prevent starvation. Alternatively, such a larger segment of data may be a more efficient unit or amount of data for processing by the software or hardware MPU 514.

In addition to slicing the media streams into independently processable segments 506a, 506b, 506c, the slicing engine 504 may also cache media stream information regarding a particular media stream to bundle with each independently processable segment 506a, 506b, 506c for use by the software or hardware MPU 514. Because the MPU 514 will constantly switch between processing segments 506a, 506b, 506c from disparate media streams, the MPU 514 will need to be reset before processing each segment with parameter information specific to the format of the original media stream. The MPU 514 may need to know, for example, the compression format and the bit rate, in order to appropriately render or transform each particular independently processable segment 506a, 506b, 506c.

Once the media streams 502 have been sliced by the slicing engine 504, the scheduling engine 510 may pull individual independently processable segments 508 from the buffer associated with the slicing engine 504 to arrange the individual segments 508 in an appropriate order for efficient processing via the designated MPU 514. The scheduling engine 510 may dispatch the individual segments 508 to a designated MPU 514 by transmission over the local network, or via a direct connection to an external device or internal CPU or GPU functioning as a software codec.

The scheduling engine 510 may receive instructions from the policy engine 512 regarding priorities to place on the processing of the plurality of competing media streams. Exemplary policies regarding resource allocation of the MPUs 514 for time-sliced media were previously described with respect to FIG. 4. The scheduling engine 510 may determine the order of individual independently processable segments 508 pulled from the slicing engine 504 based upon a variety of factors, for example, the bit rates of the media streams, the formats of the media streams, the processing speed of the MPU 514, and other factors. The scheduling engine 510 may also associate routing information with the individual segments 508 that may indicate which media processing unit 514 within the media system should process the a particular segment 508 and further the final destination, e.g., the desired presentation device or storage location, for output of a particular media stream 502.

A further component of the slicing scheme may be a routing engine 516 as depicted in FIG. 5. The routing engine 516 receives the processed data from the MPU 514 and, based upon directional instructions embedded by the scheduling engine 510, directs the processed independently processable segments as encoded, decoded, transrated, or transcoded streams to the particular output device or storage location indicated by the scheduling engine 510. Note that both the hardware or software MPU 514 and the routing engine 516 may be located upon any device within the media system, and the two components need not be on the same device. In one example, the hardware or software MPU 514 is located on a media receiver, while the routing engine 516 is located on the media server. In this example, the media data output from the MPU 514 may be transmitted back to the server before ultimate distribution of the processed and recomposed streams 518 by the routing engine 516 to the desired output device.

In one embodiment, the scheduling engine 510 may allocate the processing of a particular media stream between two MPUs within the media system. For example, in a circumstance where two media streams are competing for real-time playback, and only one hardware MPU is available, but the hardware MPU can handle processing for data corresponding to more than one but less than two full media streams, processing of one of the media streams may be split. For example, if there is additional processing capacity on a device within the media system, the scheduling engine 510 may send all the segments for one media stream and some portion, e.g., half, of the segments for the second media stream to the hardware MPU device for processing while sending the remaining segments of the second media stream, e.g., every other segment, to the processor within the media server for processing via a software MPU on the media server. Note that the segments from various streams may be scheduled in any order that provides the improved processing efficiency and need not be regularly alternated. Thus, both the bulk of the processing work load is thus performed by the hardware MPU and the potential processing load on the processor on the media server is reduced, while still servicing both requests in real time. Note that in such a case where processing duties for a single media stream are split between two separate MPUs, the scheduling engine 510 will need to provide additional serialization information beyond that required between respective GOPs in order to ensure that the preprocessed or post-processed independently processable segments are arranged for presentation in the appropriate order.

Another implementation may be based upon resource allocation directions received from a policy engine 512 and further upon functional parameters governing the scheduling engine 510. The scheduling engine 510 may provide additional processing instructions to the software or hardware MPU 514. For example, the scheduling engine 510 may instruct the MPU 514 to periodically drop frames during the processing of one of the media streams in order to increase the throughput speed of the MPU 514. In some circumstances, for example, if the media file is to be presented on a lower quality presentation device, the dropping of frames may have no appreciable or discernable impact on the quality of playback in such a lower quality device while potentially increasing throughput of the MPU 514. Thus, frame dropping may be a technique to provide greater efficiency in the time-slicing operation. Note that in other circumstances, for example, when transcoding a media stream from one format to another, e.g., to reduce the required storage capacity for archival purposes, it would be inadvisable to drop frames as future playback quality would be reduced.

Figure 6:
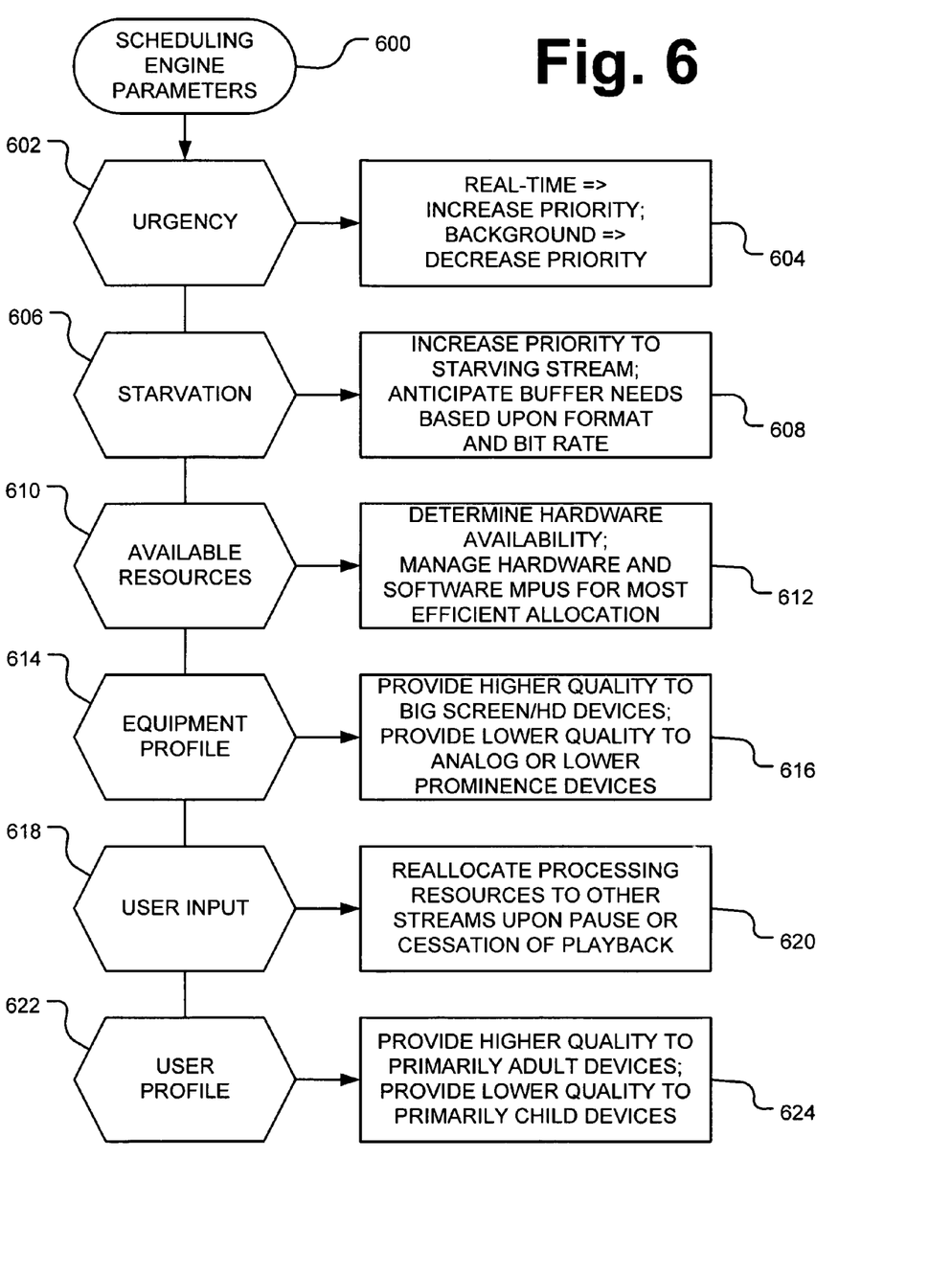
FIG. 6 is an exemplary parameter schema for scheduling a processing order among a number of time-sliced media streams.

FIG. 6 depicts a listing of possible exemplary scheduling engine parameters 600 that may be considered by the scheduling engine when determining which data segments from which media stream to pull for processing by a MPU. A first parameter 602 may be a consideration of the urgency attributed to the media stream by the policy engine. Exemplary considerations depicted in box 604 may include whether the media stream needs to be processed for real-time output or whether the output is merely for archival storage purposes. If the media stream is designated for real-time output, then the scheduling engine parameter may be set to increase the priority placed by the scheduling engine on segments from that particular media stream to send to the MPU. Alternatively, if an offline transcode or transrate operation is desired for archival purposes, which can be done in the background, then the scheduling engine may decrease the priority for selection of the segments from the slicing engine coming from that particular media stream.

A second parameter 606 may be a vague consideration of starvation prevention in real-time processing of the media stream. Exemplary starvation considerations are presented in box 608. For example, the scheduling engine may monitor buffers on playback devices within the media system receiving real-time media streams. Upon recognition that a stream is starving, i.e., the buffer plays out before new data is received or fully processed for output, the scheduling engine may increase priority to processing of independently processable segments for the starving media stream. To meet this need the scheduling engine may increase the frequency with which the segments are chosen for processing or alternatively request that the slicing engine provide larger segments of data for processing. The scheduling engine may also anticipate potential occurrences of starvation based upon format and bit rate in a speed in which the selected MPU is able to process such media formats or bit rates.

A third exemplary parameter 610 examined by the scheduling engine may be a consideration of the available resources within the media system. Exemplary considerations indicated in box 612 may include determination of hardware availability and selection and management of the available hardware and software MPUs for the most efficient processing allocation of the requested media streams.

A fourth exemplary parameter 614 may include consideration of available equipment within the media system. Exemplary considerations are outlined in box 616. For example, the scheduling engine may recognize that a request for particular media stream is for playback on a high quality presentation device, e.g., a big screen TV or a high definition television. Then the scheduling engine may place an increased priority on high-quality (e.g., lossless, or without significant signal degradation) processing of a media stream designated for output on such a device. Alternatively, if a scheduling engine is aware that an output request originated from a lower quality device, for example, an analogue television set or a black and white television set, it may place lower priority on the high-quality processing of independently processable segments of a media stream designated for output on such devices. Further as previously described above, the scheduling engine may provide instructions to the selected MPU to drop frames for output to a lower quality presentation device in order to increase capacity for competing processing requests of other media streams designated for output on higher quality media devices.

A fifth exemplary parameter 618 for consideration by the scheduling engine may be a response to user input commands received with respect to a particular competing media stream. An exemplary consideration is presented in box 620 in which the scheduling engine may monitor user input received from the presentation devices receiving real-time media streams. Upon receipt of a user input command to pause or stop playback of a particular media stream, the scheduling engine may reallocate the processing resources instantaneously to provide priority processing to the other media streams. Later, upon receipt of a user input command to resume playback of the paused media stream, the scheduling engine may readjust the priority allocations among the real-time media streams in order to account for and accommodate the increased processing requirements.

A sixth exemplary parameter 622 may consider user profile information associated with a particular presentation device for which a real-time request for a media stream is being processed. Box 624 presents one exemplary user profile consideration that may be accounted for by the scheduling engine. The scheduling engine may access information from the media system regarding users of particular devices connected within the media system. The scheduling engine may use information indicating types of user of specific devices to determine processing allocation. For example, if it is known that a particular presentation device is primarily used by adults in a household, the media stream requests for output on that particular presentation device may be a priority processing preference. Alternatively, if the profile information indicates that a particular presentation device is primarily used by children in a household, the scheduling engine may decrease priority given to processing a media stream for output on such a presentation device.

Figure 7:
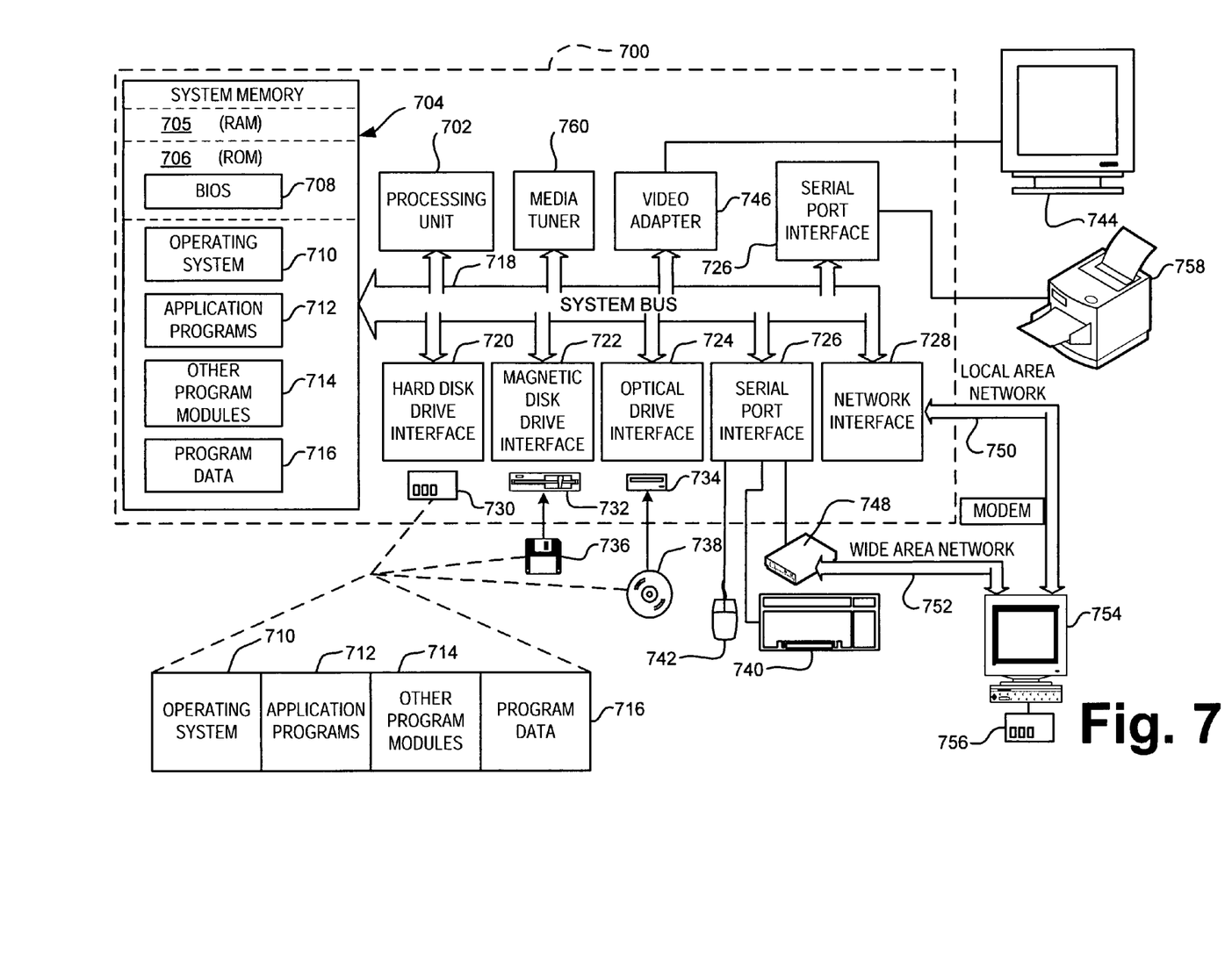
FIG. 7 is a schematic diagram of an exemplary general purpose computing system that may take the form of one or more of the devices in an implementation of a media system described herein.

FIG. 7 depicts exemplary hardware and an operating environment for implementing the invention. The media server, media receivers, and other devices within the media network may be generally described as general purpose computing devices in the form of a computer 700, including a processing unit 702, a system memory 704, and a system bus 718 that operatively couples various system components, including the system memory 704 to the processing unit 702. There may be only one or there may be more than one processing unit 702, such that the processor of computer 700 comprises a single central processing unit (CPU), or a plurality of processing units, commonly referred to as a parallel processing environment. The computer 700 may be a conventional computer, a distributed computer, or any other type of computer; the invention is not so limited.

The system bus 718 may be any of several types of bus structures including a memory bus or memory controller, a peripheral bus, a switched fabric, point-to-point connections, and a local bus using any of a variety of bus architectures. The system memory 704 may also be referred to as simply the memory, and includes read only memory (ROM) 706 and random access memory (RAM) 705. A basic input/output system (BIOS) 708, containing the basic routines that help to transfer information between elements within the computer 700, such as during start-up, is stored in ROM 706. The computer 700 further includes a hard disk drive 730 for reading from and writing to a hard disk, not shown, a magnetic disk drive 732 for reading from or writing to a removable magnetic disk 736, and an optical disk drive 734 for reading from or writing to a removable optical disk 738 such as a CD ROM or other optical media.

The hard disk drive 730, magnetic disk drive 732, and optical disk drive 734 are connected to the system bus 718 by a hard disk drive interface 720, a magnetic disk drive interface 722, and an optical disk drive interface 724, respectively. The drives and their associated computer-readable media provide nonvolatile storage of computer-readable instructions, data structures, program modules and other data for the computer 700. It should be appreciated by those skilled in the art that any type of computer-readable media that can store data that is accessible by a computer, for example, magnetic cassettes, flash memory cards, digital video disks, RAMs, and ROMs, may be used in the exemplary operating environment.

A number of program modules may be stored on the hard disk 730, magnetic disk 732, optical disk 734, ROM 706, or RAM 705, including an operating system 710, one or more application programs 712, other program modules 714, and program data 716. In an exemplary implementation, the policy engine module, the slicing engine module, the scheduling engine module, the routing engine module, and any software MPU may be incorporated as part of the operating system 710, application programs 712, or other program modules 714.

A user may enter commands and information into the personal computer 700 through input devices such as a keyboard 740 and pointing device 742, for example, a mouse. Other input devices (not shown) may include, for example, a microphone, a joystick, a game pad, a tablet, a touch screen device, a satellite dish, a scanner, a facsimile machine, and a video camera. These and other input devices are often connected to the processing unit 702 through a serial port interface 726 that is coupled to the system bus 718, but may be connected by other interfaces, such as a parallel port, game port, or a universal serial bus (USB).

A monitor 744 or other type of display device is also connected to the system bus 718 via an interface, such as a video adapter 746. In addition to the monitor 744, computers typically include other peripheral output devices, such as a printer 758 and speakers (not shown). These and other output devices are often connected to the processing unit 702 through the serial port interface 726 that is coupled to the system bus 718, but may be connected by other interfaces, such as a parallel port, game port, or a universal serial bus (USB). A media tuner module 760 may also be connected to the system bus 718 to tune audio and video programming (e.g., TV programming) for output through the video adapter 746 or other presentation output modules.

The computer 700 may operate in a networked environment using logical connections to one or more remote computers, such as remote computer 754. These logical connections may be achieved by a communication device coupled to or integral with the computer 700; the invention is not limited to a particular type of communications device. The remote computer 754 may be another computer, a server, a router, a network personal computer, a client, a peer device, or other common network node, and typically includes many or all of the elements described above relative to the computer 700, although only a memory storage device 756 has been illustrated in FIG. 7. The logical connections depicted in FIG. 7 include a local-area network (LAN) 750 and a wide-area network (WAN) 752. Such networking environments are commonplace in office networks, enterprise-wide computer networks, intranets and the Internet, which are all types of networks.

When used in a LAN 750 environment, the computer 700 may be connected to the local network 750 through a network interface or adapter 728, e.g., Ethernet or other communications interfaces. When used in a WAN 752 environment, the computer 700 typically includes a modem 748, a network adapter, or any other type of communications device for establishing communications over the wide area network 752. The modem 748, which may be internal or external, is connected to the system bus 718 via the serial port interface 726. In a networked environment, program modules depicted relative to the personal computer 700, or portions thereof, may be stored in a remote memory storage device. It is appreciated that the network connections shown are exemplary and other means of and communications devices for establishing a communications link between the computers may be used.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understand that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method in a computer system for transformatively processing two or more media streams across multiple media processing units of media devices connected within a network, the method comprising:

monitoring competing requests for processing the two or more media streams directed to a media device within the network;

allocating a media processing unit of the media device for processing a first media stream of the two or more media streams;

determining that processing resources of the allocated media processing unit of the media device are sufficient for simultaneous processing of more than one media stream but insufficient for simultaneous processing of all of the two or more media streams;

allocating available processing resources of one or more media processing units of other media devices connected within the network to split processing of a second media stream of the two or more media streams between the allocated media processing unit of the media device and the one or more media processing units of the other media devices;

dividing each of the two or more media streams into independently processable segments based upon media formats of the two or more media streams;

assigning priority for processing order to the independently processable segments;

determining processing requirements for each independently processable segment; and scheduling the independently processable segments for delivery to the allocated media processing unit of the media device and the one or more media processing units of the other media devices based upon the assigned priority and the processing requirements for each independently processable segment.

2. The method of claim 1, further comprising:
dispatching the independently processable segments to the allocated media processing unit of the media device and the one or more media processing units of the other media devices based on the scheduling.

3. The method of claim 2, further comprising:
receiving a stream of processed segments corresponding to the second media stream from the allocated media processing unit of the media device;
receiving a stream of processed segments corresponding to the second media stream from the one of the one or more media processing units of the other media devices;
assembling the processed segments corresponding to the second media stream into a processed version of the second media stream; and
routing the processed version of the second media stream for output to a presentation device.

4. The method of claim 3, further comprising:
receiving a stream of processed segments corresponding to the first media stream from the allocated media processing unit of the media device; and
assembling the processed segments corresponding to the first media stream into a processed version of the first media stream; and
storing the processed version of first media stream as a media file on a storage device.

5. The method of claim 1, further comprising:
assigning priority to the two or more media streams based upon a hierarchy of requested end uses of the two or more media streams, the requested end uses including processing the first media stream for recording and processing the second media stream for real-time viewing.

6. The method of claim 1, wherein the dividing operation further comprises including identification data within each independently processable segment indicating an original media format and bit-rate of the respective media stream from which the independently processable segment is generated.

7. A computer-readable storage device storing computer-executable instructions that, when executed, cause a computing device to perform a method comprising:
monitoring competing requests for processing two or more media streams directed to a media device within a network;
allocating a media processing unit of the media device for processing a first media stream of the two or more media streams;
determining that processing resources of the allocated media processing unit of the media device are sufficient for simultaneous processing of more than one media stream but insufficient for simultaneous processing of all of the two or more media streams;
allocating available processing resources of one or more media processing units of other media devices connected within the network to split processing of a second media stream of the two or more media streams between the allocated media processing unit of the media device and the one or more media processing units of the other media devices;
dividing each of the two or more media streams into independently processable segments based upon media formats of the two or more media streams;
assigning a priority processing order to the independently processable segments;
determining processing requirements for each independently processable segment; and
scheduling the independently processable segments for delivery to the allocated media processing unit of the media device and the one or more media processing units of the other media devices based upon the assigned priority processing order and the processing requirements for each independently processable segment.

8. A method in a media processing unit of a media device within a network for processing independently processable segments of a media stream, the method comprising:
receiving competing requests for processing two or more media streams at the media device, the media processing unit of the media device having processing resources sufficient for simultaneous processing of more than one media stream but insufficient for simultaneous processing of all of the two or more media streams;
receiving, at the media processing unit of the media device from a media server within the network, a plurality of independently processable segments corresponding to all of a first media stream of the two or more media streams and a portion of a second media stream of the two or more media streams, wherein processing of the second media stream is split between the media processing unit of the media device and one or more media processing units of other media devices within the network;
performing a transformative processing operation on the plurality of independently processable segments; and
transmitting an output stream of processed segments to the media server for assembling a processed version of the first media stream from processed segments corresponding to the first media stream received from the media processing unit of the media device and assembling a processed version of the second media stream from processed segments corresponding to the second media stream received from the media processing unit of the media device and processed segments corresponding to the second media stream received from the one or more media processing units of the other media devices.

9. The method of claim 8, wherein the competing requests received by the media device comprise a request for processing the first media stream for recording and a request for processing the second media stream for real-time viewing.

10. The method of claim 8, wherein the transformative processing of individual independently processable segments occurs in an order that the individual independently processable segments are received at the media processing unit of the media device without regard to any relationship of the individual independently processable segments to the first or second media streams.

11. The method of claim 8, wherein the transformative processing of individual independently processable segments occurs in an order as determined by a processing priority assigned to each individual independently processable segment based on a respective priority of the first and second media streams.

12. The method of claim 8, wherein the transformative processing operation comprises one or more of an encode function, a decode function, a transcode function, or a transrate function.

13. The method of claim 8, wherein the transformative processing operation is performed using a hardware codec.

14. The method of claim 8, wherein the transformative processing operation is performed using a software-implemented codec.

15. A computer-readable storage device storing computer-executable instructions that, when executed, cause a computing device in a network to perform a method comprising:
   receiving competing requests for processing two or more media streams;
   receiving, at a media processing unit of the computing device from a media server within the network, a plurality of independently processable segments corresponding to all of a first media stream of the two or more media streams and a portion of a second media stream of the two or more media streams when processing resources of the media processing unit are sufficient for simultaneous processing of more than one media stream but insufficient for simultaneous processing of all of the two or more media streams, wherein processing of the second media stream is split between the media processing unit of the computing device and one or more media processing units of other media devices within the network;
   performing a transformative processing operation on the plurality of independently processable segments; and
   transmitting an output stream of processed segments to the media server, wherein the media server is configured to:
      assemble a processed version of the first media stream from processed segments corresponding to the first media stream received from the media processing unit of the computing device, and
      assemble a processed version of the second media stream from processed segments corresponding to the second media stream received from the media processing unit of the computing device and processed segments corresponding to the second media stream received from the one or more media processing units of the other media devices.

16. A system for transformatively processing two or more media streams across multiple media processing units of media devices connected within a network, the system comprising:
   memory storing computer-executable program modules comprising:
      a slicing engine module that divides the two or more media streams into independently processable segments based upon media formats of the two or more media streams;
      a policy engine module that:
         monitors competing requests for processing the two or more media streams directed to a media device within the network,
         allocates a media processing unit of the media device for processing a first media stream of the two or more media streams,
         determines that processing resources of the allocated media processing unit of the media device are sufficient for simultaneous processing of more than one media stream but insufficient for simultaneous processing of all of the two or more media streams,
         allocates available processing resources of one or more media processing units of other media devices connected within the network to split processing of a second media stream of the two or more media streams between the allocated media processing unit of the media device and the one or more media processing units of the other media devices, and
         assigns a priority processing order to the independently processable segments; and
      a scheduling engine module that determines processing requirements for each independently processable segment and schedules the independently processable segments for delivery to the allocated media processing unit of the media device and the one or more media processing units of the other media devices based upon the assigned priority processing order and the processing requirements for each independently processable segment; and
   a processing unit for executing the computer-executable program modules.

17. The system of claim 16, wherein the slicing engine further includes data within each independently processable segment indicating an original media format and bit-rate of the respective media stream from which each independently processable segment is generated.

18. The system of claim 16, wherein the scheduling engine module further dispatches the independently processable segments to the allocated media processing unit of the media device and the one or more media processing units of the other media devices.

19. The system of claim 18, wherein the computer-executable program modules further comprise:
   a routing engine module that routes a processed version of the second media stream to a presentation device, the processed version of the second media stream being assembled from processed segments corresponding to the second media stream returned from the allocated media processing unit of the media device and the one or more media processing units of the other media devices.

20. The system of claim 19, wherein the routing engine module routes a processed version of the first media stream to a storage device, the processed version of the first media stream being assembled from processed segments corresponding to the first media stream returned from the allocated media processing unit of the media device.

* * * * *